2,849,136
BOAT TRAILER

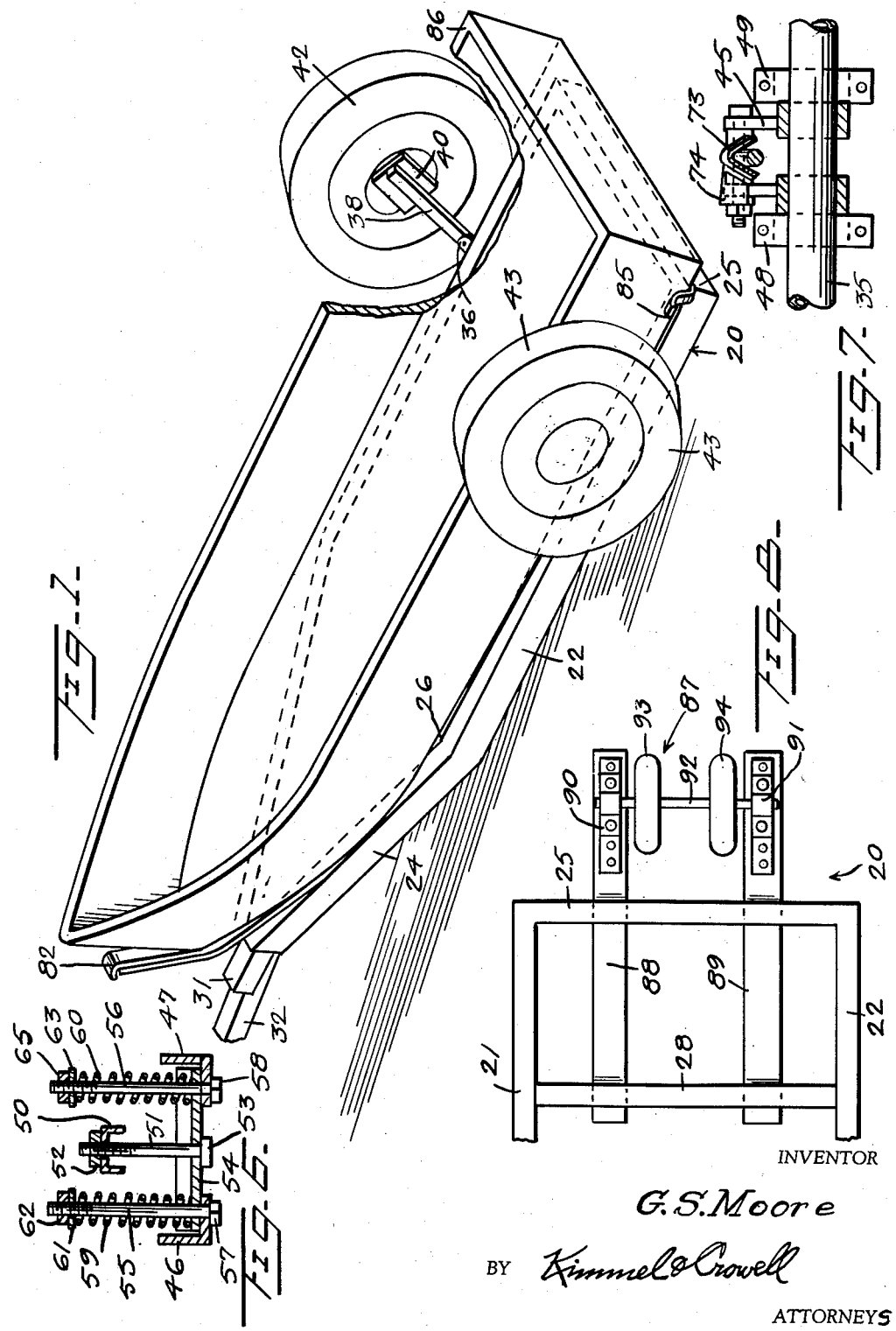

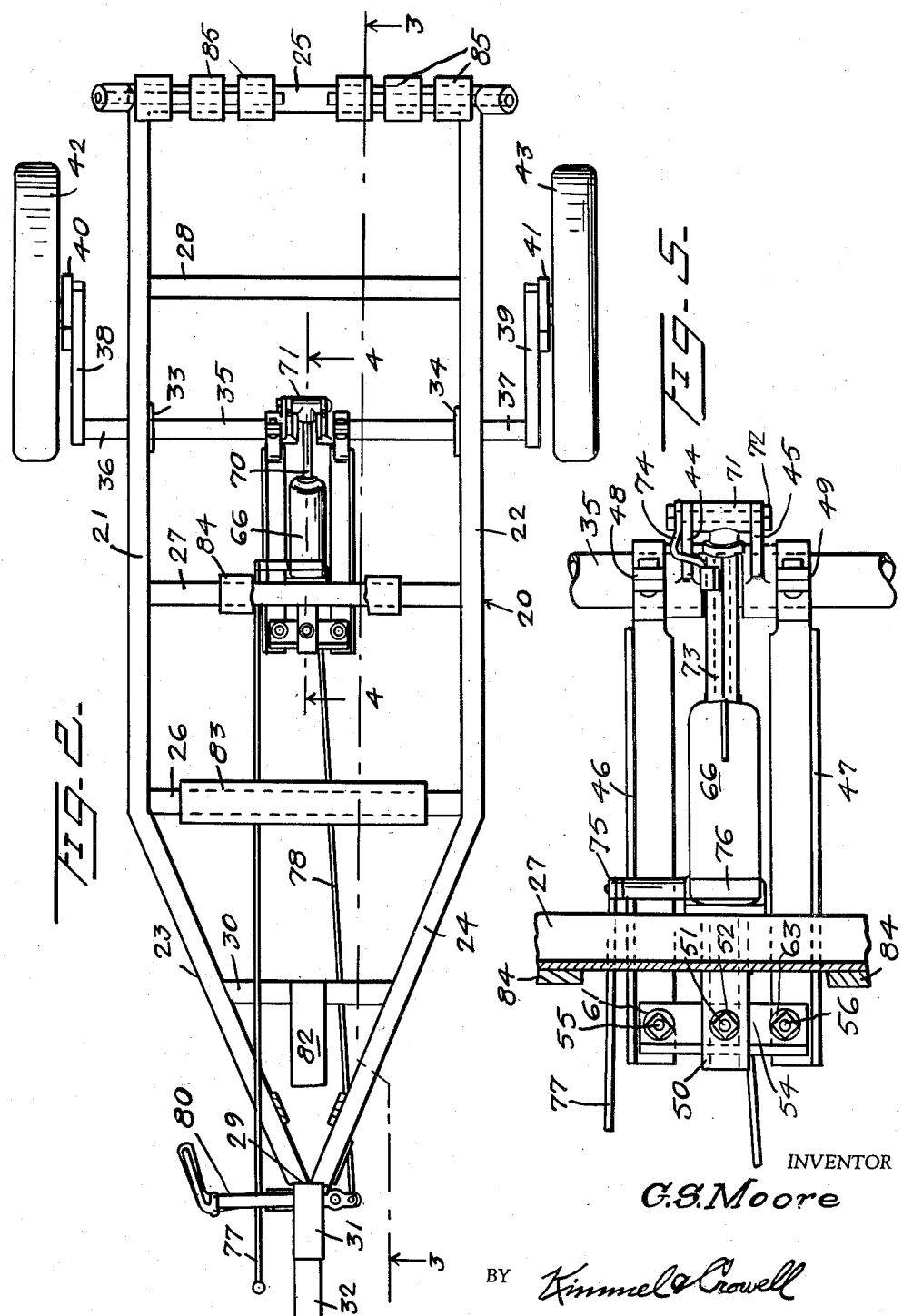

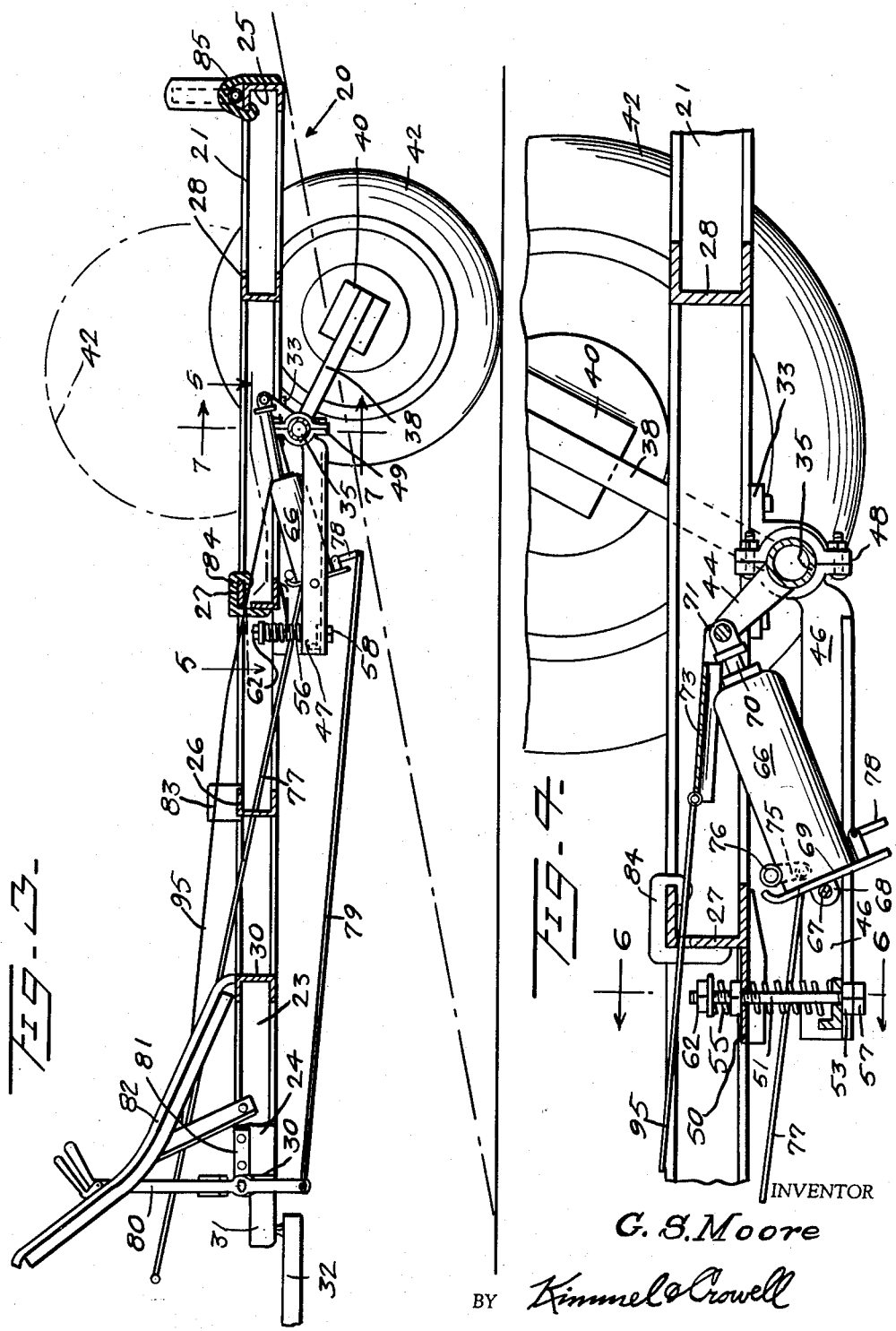

George S. Moore, Mendota, Ill.

Application November 19, 1956, Serial No. 622,947

3 Claims. (Cl. 214—506)

The present invention relates to boat trailers, and more particularly to boat trailers of the type which are adapted to be raised and lowered to assist in the loading and launching of boats carried thereon.

The primary object of the invention is to provide a boat trailer having means associated therewith for lowering the rear end of the frame of the trailer with respect to the ground and to its supporting wheels to aid in the loading and launching of boats carried thereon.

Another object of the invention is to provide a trailer for carrying boats having remotely controlled and actuated hydraulic means for raising and lowering the trailer frame with respect to the trailer wheels.

A further object of the invention is to provide a boat trailer of the class described above in which a resilient spring mounting for the trailer frame is combined with the raising and lowering mechanism therefor.

A still further object of the invention is to provide a trailer for supporting, loading and launching boats which is inexpensive to manufacture, simple to operate, and which will permit the loading and launching of boats therefrom by an individual.

Other objects and advantages will become apparent in the following specification when considered in the light of the attached drawings, in which:

Figure 1 is a perspective view of the invention shown in lowered position with a boat loaded thereon with parts broken away for convenience of illustration.

Figure 2 is a fragmentary plan view of the invention.

Figure 3 is a longitudinal cross-section taken along the line 3—3 of Figure 2, looking in the direction of the arrows.

Figure 4 is an enlarged fragmentary longitudinal cross-section taken along the line 4—4 of Figure 2, looking in the direction of the arrows.

Figure 5 is an enlarged fragmentary horizontal cross-section taken along the line 5—5 of Figure 3, looking in the direction of the arrows.

Figure 6 is a fragmentary transverse cross-section taken along the line 6—6 of Figure 4, looking in the direction of the arrows.

Figure 7 is an enlarged fragmentary vertical cross-section taken along the line 7—7 of Figure 3, looking in the direction of the arrows.

Figure 8 is a fragmentary plan view illustrating a launching roller attachment for the trailer.

Referring now to the drawings in detail wherein like reference characters indicate like parts throughout the several figures, the reference numeral 20 indicates generally a boat trailer constructed in accordance with the invention.

The boat trailer 20 has a pair of spaced parallel longitudinally extending channel frame members 21 and 22 provided with forwardly converging portions 23 and 24, respectively. The channel members 21 and 22 are connected at their rear ends by means of a transversely extending rear channel member 25, and at their forward ends by means of a transversely extending forward channel member 26.

Intermediate channel members 27 and 28 extend between the channel members 21 and 22 in spaced parallel relation to the channel members 25 and 26. The converging channel members 23 and 24 are connected together by welding or the like at 29. The medial portions of the converging channel members 23 and 24 are joined by a somewhat shorter transverse channel member 30, as best seen in Figure 2.

A trailer hitch 31 is secured to and extends forwardly of the converging portions 23 and 24 of the channel members 21 and 22 and is adapted for connection for a conventional draw bar 32 extending rearwardly from a motor vehicle (not shown).

A bearing 33 is secured to the underside of the channel member 21 between the cross channel members 27 and 28. A second bearing 34 is secured underneath the channel member 22 in aligned relation to the bearing 33. A shaft 35 is journalled in the bearings 33 and 34 and is provided with end portions 36 and 37 projecting beyond the channel members 21 and 22, respectively.

Arms 38 and 39 extend perpendicularly, respectively, from the ends 36 and 37 of the shaft 35 and have spindle members 40 and 41 secured to the outer ends thereof, respectively. Wheel and tire assemblies 42 and 43 are journalled for rotation on the spindles 40 and 41, respectively. Crank arms 44 and 45 are secured to the shaft 35 in spaced parallel relation by welding or the like. The crank arms 44 and 45 extend perpendicularly to the axis of the shaft 35.

A pair of spaced parallel longitudinally extending angle iron members 46 and 47 are provided with split bearings 48 and 49, respectively, engaging about the shaft 35 so that the shaft 35 may rotate within the bearings 48 and 49.

A channel bracket 50 is secured to the cross member 27 and extends forwardly thereof, as seen in Figure 5. A bolt 51 extends through the channel bracket 50 and is suspended thereon by means of a nut 52. The head 53 of the bolt 51 supports from its medial center an angle iron member 54.

A pair of bolts 55 and 56 extend upwardly through the angle irons 46 and 47 and through opposite ends of member 54 resting thereon. The bolts 55 and 56 have their heads 57 and 58 engaged against the undersides of the angle irons 46 and 47, respectively. A pair of coil springs 59 and 60 engage the member 54 at their lower ends encompassing the bolts 55 and 56, respectively, and are secured thereon by means of washers 61 and 63 and nuts 62 and 65, respectively.

A hydraulic jack 66 is journalled on a pin 67 extending transversely between the angle irons 46 and 47 by means of ears 68 through which the pin 67 extends. The ears 68 extend outwardly from the base 69 of the jack 66, as best seen in Figure 4.

A piston rod 70 extends axially of the jack 66 and has a T-shaped journal 71 secured to its outer end. The journal 71 is pivotally secured between the outer ends of the crank arms 44 and 45 by means of a journal pin 72 extending therebetween.

A V-shaped safety member 73 is mounted by means of a bracket 74 to one end of the pivot pin 72 so that the safety member 73 may move thereabout.

A crank arm 75 is connected to the conventional relief valve mechanism 76 on the jack 66 and an operating rod 77 is connected to the crank arm 75 extending forwardly therefrom for operation of the valve 76 from a remote point on the trailer.

The conventional hydraulic pump (not shown) in the jack 66 is operated by a lever 78 connected by an elongated rod 79 to an operating lever 80 pivotally secured to a bracket 81 mounted on the forward end of the trailer 20, as best shown in Figure 3.

The trailer 20 is provided with supports 82, 83, 84 and 85 positioned therealong for supporting a boat 86 thereon. Obviously the supports 82, 83, 84 and 85 will be formed to fit the particular boat 86 to be carried by the trailer 20.

Referring now to Figure 8, an attachment generally indicated at 87 is provided for the trailer 20. The attachment 87 comprises a pair of longitudinally extending arms 88 and 89 arranged in spaced parallel relation and secured to the cross members 25 and 28 so as to extend rearwardly of the cross member 25. A pair of journal bearings 90 and 91 are carried by the rear ends of the members 88 and 89, respectively, in axially aligned relation and have a shaft 92 journalled therein. Rubber tired rollers 93 and 94 are carried by the shaft 92. The rollers 93 and 94 extend above the cross members 25 and 28 and provide an anti-friction support for a boat during the process of loading and unloading the boat.

In the use and operation of the invention, the trailer 20 has the rear end thereof raised and lowered with respect to the earth's surface by pivoting the shaft 35 on its axis permitting the arms 38 and 39 to change their angle with respect to the earth's surface, and consequently lower the trailer. The shaft 35 is rotated in the bearings 33 and 34 by means of the jack 66 pressing against the crank arms 44 and 45 at one end and the angle irons 46 and 47 at the other end.

When the trailer 20 is in its upper position, as illustrated in Figure 3, the piston rod 70 of the jack 66 is fully extended and the safety member 73 is engaged between the jack 66 and the T journal 71, as shown in Figures 3 and 5.

A cable 95 extends forwardly of the trailer 20 and provides means whereby the safety member 73 can be pivoted to a non-engaging position when it is desired to lower the trailer 20.

In travelling with the trailer 20, the wheels 42 and 43 tend to move upwardly with respect thereto when striking bumps and obstructions. This action of the wheels 42 and 43 causes the shaft 35 to rotate in the bearings 33 and 34 forcing the crank arms 44 and 45 against the hydraulic jack 66. The hydraulic jack 66 being pivoted to the angle iron members 46 and 47 causes these members to pivot about the shaft 35 against the tension of springs 59 and 60 carried by the support 54, bolt 51, and bracket 50. This arrangement provides a resilient mounting for the wheels 42 and 43 and prevents damage to the boat 86 during its transit.

In launching a boat from the trailer 20, the trailer is backed so that its wheels 42 and 43 are in the water and the trailer 20 is lowered by first jacking the jack 66 in a direction to raise the trailer 20 slightly so that the safety member 73 can be removed. When the valve 76 is operated releasing the jack 66, the trailer 20 is permitted to lower until the boat 86 has the rear end thereof floating in the water. The forward portion of the boat is then pushed rearwardly on the trailer 20 until it floats off completely. The loading of the trailer is handled in a reverse manner, and the boat 86 is secured to the trailer 20 by any suitable means (not shown). The rollers 93 and 94 illustrated in Figure 8 are used where direct launching into the water is not possible in the manner described above.

It will be understood that although described for use as a trailer for boats, this is not intended as a limitation as this trailer can also be successfully used for concession trailers at fairs and carnivals as it will enable the operators to place their equipment closer to the ground without removing same. Also, this trailer is very useful to dealers in farm and other equipment as it makes it possible to drive the equipment on or off the trailer when in a lowered position. Other uses will be readily apparent.

Having thus described the preferred embodiment of the invention, it should be understood that numerous structural modifications and adaptations may be resorted to without departing from the scope of the appended claims.

What is claimed is:

1. A trailer comprising a frame, means detachably connecting the forward end of said frame to a towing vehicle, a shaft extending transversely of said frame and journalled for rotation thereon, crank arms extending perpendicularly from opposite ends of said shaft, a wheel journalled on the end of each of said crank arms opposite said shaft, an arm having one end journalled on said shaft, resilient means securing the opposite end of said arm to said frame, a hydraulic jack pivotally mounted to said arm, a crank arm fixed to said shaft intermediate the opposite ends thereof, and a piston rod extending from said jack and pivotally connected to said last named crank arm.

2. A device as claimed in claim 1 wherein an angle iron safety member is pivotally carried by said crank arms for engagement with said piston rod between said last named crank arm and said jack to prevent movement of said piston rod.

3. A device as claimed in claim 2 wherein remote means are provided on said trailer for actuating said jack, and additional remote means are provided on said trailer for controlling said jack.

References Cited in the file of this patent
UNITED STATES PATENTS

| | | |
|---|---|---|
| 2,227,762 | Ronning | Jan. 7, 1941 |
| 2,452,267 | Schramm | Oct. 26, 1948 |